United States Patent
Kadowaki et al.

(10) Patent No.: US 6,701,266 B2
(45) Date of Patent: Mar. 2, 2004

(54) MEASUREMENT DATA FAIRING METHOD

(75) Inventors: Soichi Kadowaki, Kawasaki (JP);
Naoji Horiuchi, Kawasaki (JP);
Tomonori Goto, Sapporo (JP)

(73) Assignee: Mitutoyo Corporation, Kawasaki (JP)

(*) Notice: Subject to any disclaimer, the term of this patent is extended or adjusted under 35 U.S.C. 154(b) by 0 days.

(21) Appl. No.: 10/388,808

(22) Filed: Mar. 17, 2003

(65) Prior Publication Data

US 2003/0188445 A1 Oct. 9, 2003

(30) Foreign Application Priority Data

Mar. 22, 2002 (JP) .................................... 2002-080535

(51) Int. Cl.[7] .............................................. G01B 21/20
(52) U.S. Cl. .......................... 702/94; 702/95; 700/180; 33/503
(58) Field of Search ........................ 702/94, 95, 150; 700/180, 184, 194; 33/503, 504; 324/758; 73/865.04

(56) References Cited

U.S. PATENT DOCUMENTS 5,521,847 A * 5/1996 Ostrowski et al. .......... 702/152
6,317,991 B1 * 11/2001 Rinn ............................ 33/1 M

FOREIGN PATENT DOCUMENTS

| JP | A 11-339052 | 12/1999 | |
| JP | 2000-258149 | * 9/2000 | ........... G01B/21/20 |
| JP | A 2000-331171 | 11/2000 | |

* cited by examiner

Primary Examiner—Kamini Shah
(74) Attorney, Agent, or Firm—Oliff & Berridge, PLC

(57) ABSTRACT

The measurement data fairing method includes: determining an interval in which a geometrical element is to be fitted to measurement data; extracting, from the data, interval measurement data of the fitting interval and robustly fitting the element; removing, on the basis of a result of the robust fitting, outlier from the interval measurement data; computing a statistic of a residual of the interval measurement data after the outlier removing step; and removing, as invalid data, measurement data that exceeds a predetermined limit value of the statistic of the residual from the interval measurement data after the outlier removing step on the basis of the statistic of the residual computed in the computing step.

10 Claims, 15 Drawing Sheets

ALLOWABLE RESIDUAL
=0.075mm

ALLOWABLE RESIDUAL
=0.1mm

ALLOWABLE RESIDUAL
=0.25mm

ALLOWABLE RESIDUAL
=0.075mm

ALLOWABLE RESIDUAL
=0.1mm

ALLOWABLE RESIDUAL
=0.25mm

MEASUREMENT DATA FAIRING METHOD

RELATED APPLICATIONS

The present application claims priority from Japanese Patent Application No. 2002-80535, filed on Mar. 22, 2002, which is herein incorporated by reference.

FIELD OF THE INVENTION

The present invention relates generally to a measurement data fairing method, and more particularly to the improvement of a technique for smoothing contour data.

BACKGOUND OF THE INVENTION

Measuring machines, such as coordinate measuring machines (form measuring instruments, three-dimensional measuring machines, etc.), are used in order to conduct precise measurement of contour of objects. For instance, with coordinate measuring machines, a measuring surface of a measured object is traced with a probe at a constant sampling pitch and coordinate data of points on the measuring surface are obtained, whereby contour information of the measuring surface is obtained.

In the above-described measuring machines, it is easy for noise to ride on the measurement data due to, for example, the measuring surface being scanned at a fast speed with a probe, the use of a non-contact probe, or disturbances resulting from signals and the like from an electrical systems is input. For this reason, precise contour recognition becomes difficult using raw measurement data as it is.

Thus, conventionally, when conducting contour recognition and the like, raw measurement data is not directly evaluated, but data is evaluated after fairing processing to remove noise components from the waveform of the raw measurement data has been administered to the data.

Conventionally, a method such as the following has been used as the measurement data fairing method. Namely, data of an initial fitting number is first obtained from contour data. Then, a geometrical element, such as a circle or straight line, is fitted to the data. Then, a fitting interval of the element is successively extended from an endpoint of the element within a predetermined range of error with respect to subsequent data (e.g., see Japanese Patent Application Laid-Open Publication (JP-A) No. 11-339052 and JP-A No. 2000-331171).

However, in the above-described conventional method, results of fairing processing of a waveform are easily disturbed by outlier, leaving room for improvement with respect to this point.

Thus, conventionally, a method using digital filter processing has been conceivable. However, when digital filter processing is used, division into plural intervals is necessary in order to minimize contour distortion resulting from the processing. In this division, it is necessary to divide into appropriate portions in accordance with the contour, and it is difficult to conduct versatile processing.

With respect to each of the divided intervals, three-dimensional data must be expanded to two-dimensional constant pitch data to match input of the filter. If the original data becomes an uneven pitch after the expansion, constant pitch processing thereof becomes newly necessary. Also, approximation of the data is conducted by the constant pitch processing. For this reason, the burden with respect to processing is heavy in digital filter processing.

Additionally, because digital filter processing is not enough to satisfy with versatility with respect to the data, it has not come to be adopted as means for solution.

DISCLOSURE OF THE INVENTION

The present invention was conceived in light of the above-described problems of the prior art, and it is an object thereof to provide a measurement data fairing method with which fairing processing of measurement data can be conducted excellently while reducing the burden of the fairing processing of the measurement data.

In order to achieve this object, a measurement data fairing method according to the invention is a measurement data fairing method that fits a geometrical element to measurement data and conducts fairing processing of the measurement data on the basis of a statistic of a residual of the measurement data with respect to the geometrical element, the method comprising a fitting interval determination step, a geometrical element fitting step, an outlier removal step, a statistic computation step, and an invalid data removal step.

In the fitting interval determination step, an interval in which the geometrical element is to be fitted to the measurement data is determined.

In the geometrical element fitting step, interval measurement data in the fitting interval is extracted from the measurement data and the geometrical element is robustly fitted to the extracted interval measurement data.

In the outlier removal step, outlier is removed from the interval measurement data on the basis of the result of the robust fitting conducted by the geometrical element fitting step, and the remaining interval measurement data is used as the interval measurement data.

In the statistic computation step, a statistic of a residual of the interval measurement data after the outlier removal step is computed with respect to the geometrical element fitted in the geometrical element fitting step.

In the invalid data removal step, measurement data that exceeds a predetermined limit value of the statistic of the residual of the measurement data with respect to the geometrical element is removed as invalid data from the interval measurement data after the outlier removal step on the basis of the statistic of the residual computed in the statistic computation step, and the remaining interval measurement data is used as the interval measurement data.

In the invention, it is preferable to successively conduct the geometrical element fitting step, the outlier removal step, the statistic computation step, and the invalid data removal step with respect to a next fitting interval using, as a starting point of the next fitting interval, next data adjacent to an ending point of the interval determined in the fitting interval determination step.

Also, in the invention, it is preferable for the fitting interval determination step to comprise an initial interval setting step, an initial fitting step, and an interval extension step.

In the initial interval setting step, an initial interval of a predetermined data number is set for the measurement data.

In the initial fitting step, initial interval measurement data in the initial interval set in the initial interval setting step is extracted from the measurement data, and the geometrical element is fitted to the extracted initial interval measurement data.

In the interval extension step, the initial interval is extended in a range in which the residual of the measurement data with respect to the geometrical element fitted in the initial fitting step does not exceed a predetermined allowable residual of the measurement data with respect to the geometrical element, and the initial interval is used as the fitting interval of the geometrical element.

Also, in the invention, it is preferable for the fitting interval determination step to comprise an interval number setting step, a moving average step, and a dividing step.

In the interval number setting step, a number of intervals of the measurement data is set.

In the moving average step, a moving average curve of the measurement data is sought.

In the dividing step, the measurement data is divided, on the basis of a result when a length of the moving average curve sought in the moving average step has been divided at the interval number set in the interval number setting step, into the interval number set in the interval number setting step, and the divided intervals are respectively used as the fitting interval.

Also, in the invention, the moving average step preferably comprises an auxiliary data generation step and a computation step.

In the auxiliary data generation step, auxiliary data of at least one of prepositional data prepared at a portion before a starting point of the measurement data and postpositional data prepared after an ending point of the measurement data are generated.

In the computation step, the moving average curve is sought from the measurement data and the auxiliary data.

Also, in the invention, the auxiliary data are preferably generated by mirroring conversion using the starting point or the ending point of the measurement data as a center.

Also, in the invention, when a distance between the starting point and the ending point of the measurement data is within a predetermined distance, the prepositional data are preferably generated using part of the measurement data positioned before the ending point of the measurement data and the postpositional data are preferably generated using part of the measurement data positioned after the starting point of the measurement data.

Also, in the invention, a type of the geometrical element preferably comprises one or two or more types selected from the group consisting of a straight line, a kinked line, and a circular arc.

Also, in the invention, a type of the geometrical element preferably comprises plural geometrical elements.

By "comprises plural geometrical elements" is meant not only types of elements such a straight line, a kinked line, and a circular arc, but comprising elements whose starting points and directional vectors are different, even if the type of the element is the same straight line.

Moreover, in the invention, a starting point of the fitting geometrical element is preferably present on the geometrical element in an adjacent previous interval.

BEST MODE FOR CARRYING OUT THE INVENTION

Preferred embodiments of the present invention will be described below on the basis of the drawings.
First Embodiment The schematic structure of a measurement data fairing device 10 for conducting a measurement data fairing method pertaining to a first embodiment of the invention is illustrated in FIG. 1.

Figure 1:
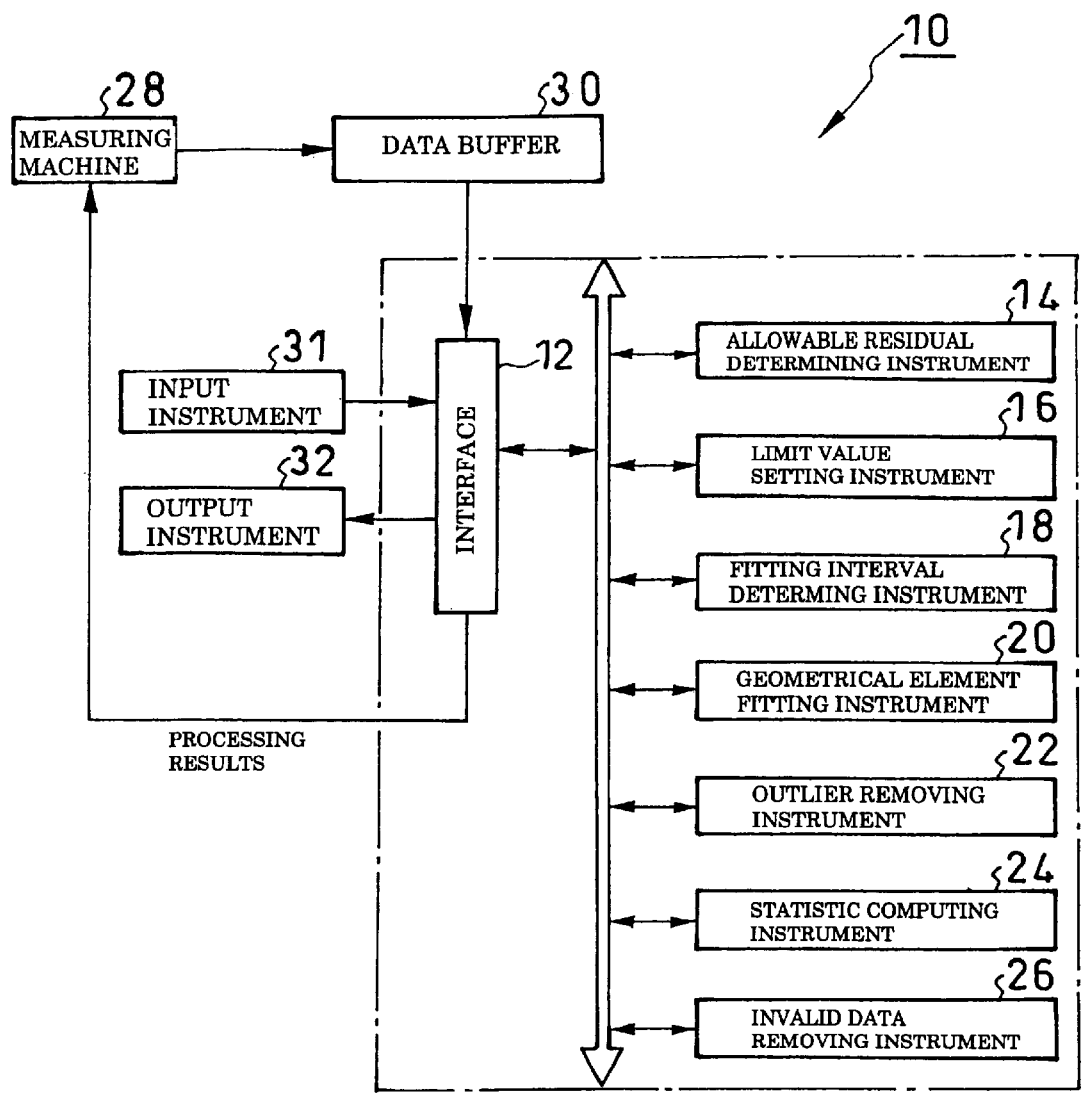
FIG. 1 is an explanatory diagram of the schematic structure of a device for conducting a measurement data fairing method pertaining to a first embodiment of the invention.

The measurement data fairing device 10 illustrated in FIG. 1 comprises an interface 12, an allowable residual setting instrument 14, a limit value setting instrument 16, a fitting interval determining instrument 18, a geometrical element fitting instrument 20, an outlier removing instrument 22, a statistic computing instrument 24, and an invalid data removing instrument 26.

A data buffer 30, which stores contour data from a measuring machine 28 such as a coordinate measuring machine, is connected to the interface 12. The allowable residual setting instrument 14, the limit value setting instrument 16, the fitting interval determining instrument 18, the geometrical element fitting instrument 20, the outlier removing instrument 22, the statistic computing instrument 24, and the invalid data removing instrument 26 are also connected to the interface 12.

An allowable residual with respect to geometrical elements, such as a straight line, a kinked line, and a circular arc, is stored for each geometrical element in the allowable residual determining instrument 14.

A limit value of a statistic of a residual of the measurement data with respect to the geometrical elements is stored for each geometrical element in the limit value setting instrument 16.

Contour data from the measuring machine 28 that is stored in the data buffer 30 is inputted to the fitting interval determining instrument 18 via the interface 12.

The fitting interval determining instrument 18 determines an interval in which the geometrical element is to be fitted to the measurement data from the data buffer 30.

The geometrical element fitting instrument 20 extracts, from the measurement data, measurement data of the fitting interval determined by the fitting interval determining instrument 18 and robustly fits the geometrical element to the measurement data of the interval.

The outlier removing instrument 22 detects outlier from the result of the robust fitting with respect to the geometrical element fitted by the geometrical element fitting instrument 20, and removes the outlier from the interval measurement data. Interval measurement data from which the outlier has been removed is used as second interval measurement data.

The statistic computing instrument 24 computes a statistic of a residual of the second interval measurement data with respect to the fitting geometrical element.

The invalid data removing instrument 26 detects, as invalid data, second interval measurement data that exceeds the limit value set by the limit value setting instrument 16, on the basis of the statistic of the residual computed at the statistic computing instrument 24, and removes the invalid data from the second interval measurement data. Second interval measurement data from which the invalid data has been removed is used as third interval measurement data.

When fairing processing of the measurement data of the interval is concluded, fairing processing of the adjacent next interval is initiated. Namely, in the present embodiment, the next datum adjacent to a terminal point of the interval determined by the fitting interval determining instrument 18 becomes the starting point of the next fitting interval. Then, fitting of the geometrical element by the geometrical element fitting instrument 20 is successively conducted with respect to the next fitting interval. Then, the removal of outlier by the outlier removing instrument 22, the statistic computation by the statistic computing instrument 24, and the removal of invalid data by the invalid data removing instrument 26 are repeated, whereby fairing processing is conducted with respect to all of the measurement data from the data buffer 30.

It should be noted that, in the present embodiment, the measurement data fairing device 10 connects endpoints between each element after fitting of the present embodiment to all of the data.

Also, a manual input instrument 31, such as a keyboard or a mouse, is comprised in the present embodiment. Parameters, such as the limit value and allowable residual of distance of separation between each measurement datum and the geometrical element, are inputted for each geometrical element by the manual input instrument 31. The allowable residual is stored for each geometrical element in the allowable residual setting instrument 14. The limit value is stored for each geometrical element in the limit value setting instrument 16.

Also, an external output instrument 32, such as a display or printer, is comprised in the present embodiment. The result of the fairing processing and the like is outputted to the external output instrument 32.

Moreover, in the present embodiment, it is possible to feed back fairing processing results obtained by the measurement data fairing device 10 to the measuring machine 28.

Figure 2:
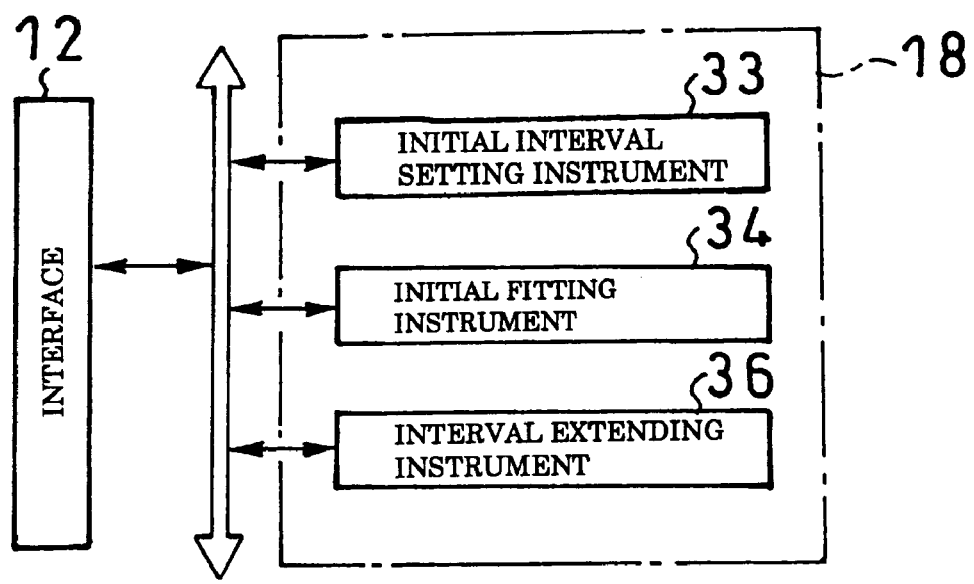
FIG. 2 is an explanatory diagram of a characteristic fitting interval determining instrument in the device for conducting the measurement data fairing method pertaining to the first embodiment of the invention.

The characteristic feature in the present embodiment is that, as shown in FIG. 2, the fitting interval determining instrument 18 comprises an initial interval setting instrument 33, an initial fitting instrument 34, and an interval extending instrument 36.

Namely, the initial interval setting instrument 33 sets an initial interval of a predetermined data number to the measurement data.

The initial fitting instrument 34 extracts measurement data of the initial interval from the measurement data and robustly fits the geometrical element to the initial interval measurement data.

The interval extending instrument 36 extends the initial interval in a range in which the residual of the measurement data with respect to the geometrical element initially fitted by the initial fitting instrument 34 does not exceed the allowable residual, and makes the initial intervals into the fitting intervals.

Figure 3:
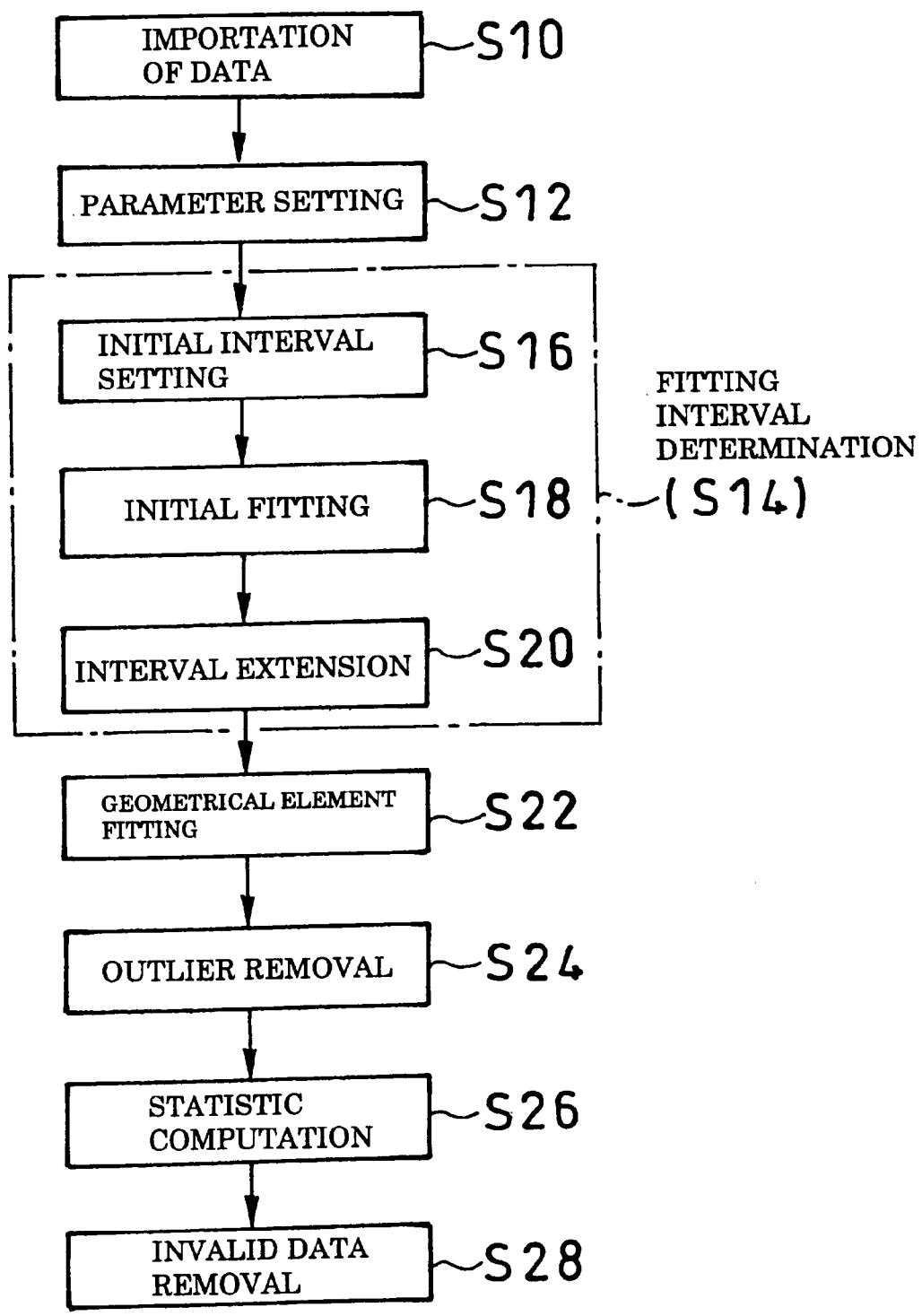
FIG. 3 is an explanatory diagram of a processing order of the measurement data fairing method pertaining to the first embodiment of the invention.

The measurement data fairing device 10 pertaining to the present embodiment is schematically structured as described above, and the action thereof will now be described with reference to FIG. 3.

First, measurement data is imported from the data buffer to the measurement data fairing device (S10).

Namely, when the geometrical contour of a sample is of two-dimensionals, the data is imported as a two-dimensional data group. The positions of the coordinate data are then plotted on coordinate axes of a display.

A parameter setting step (S12) is conducted after the importation of the data (S10).

In the present embodiment, the parameter setting step (S12) comprises an allowable residual setting step and a limit value setting step.

Namely, in the allowable residual setting step, an operator inputs the allowable residual with respect to the geometrical element for each geometrical element using the manual input instrument. The allowable residual is set in the allowable residual setting instrument.

In the limit value setting step, the operator inputs the limit value of the statistic of the residual of the measurement data with respect to the geometrical element for each geometrical element using the manual input instrument. The limit value is set in the limit value setting instrument.

An fitting interval determination step (S14) is conducted after the parameter setting step (S12).

Namely, in the fitting interval determination step (S14), an interval in which the geometrical element is to be fitted to the measurement data is determined.

The characteristic feature in the present embodiment is that the fitting interval determination step (S14) comprises an initial interval setting step (S16), an initial fitting step (S18), and an interval extension step (S20).

In the initial interval setting step (S16), the initial interval of the predetermined data number is set to the measurement data.

In the initial fitting step (S18), measurement data of the initial interval set in the initial interval setting step (S16) is extracted from the measurement data. The geometrical element is robustly fitted to the measurement data of the initial interval.

Namely, in the initial fitting step (S18), it is determined whether the geometrical element that is most approximate to the measurement data of the initial interval is a circle or a line.

For example, a performance function $a_0(x^2+y^2)-2a_1x-2a_2y+a_3=0$ is fitted with respect to the measurement data of the initial interval, and parameters $a_0$, $a_1$, $a_2$, $a_3$ of the performance function are sought.

A radius of curvature r is sought from the sought parameters $a_0$, $a_1$, $a_2$, $a_3$, a comparison of the size of the sought radius of curvature r with the size of a referential radius of curvature R is conducted, and it is determined whether the geometrical element that is most approximate to the measurement data of the initial interval is a circular element or a straight line element.

Namely, if the sought radius of curvature r is greater than the referential radius of curvature R, then the element that is most approximate to the measurement data of the initial interval is determined to be a linear element. If the sought radius of curvature r is less than or equal to the referential radius of curvature R, then the element that is most approximate to the measurement data of the initial interval is determined to be a circular element.

Fitting parameters are sought after the determination of the type of the element.

Namely, when the element that is most approximate to the measurement data of the initial interval is a linear element, a normal line vector $(n_x, n_y)$ and a distance c to an origin in $n_x x+n_y y+c=0$ are sought as fitting parameters. When the element that is most approximate to the measurement data of the initial interval is a circular element, then a center (a, b) and a radius r in $\{(x-a)^2+(y-b)^2\}^{0.5}-r=0$ are sought.

Figure 4:
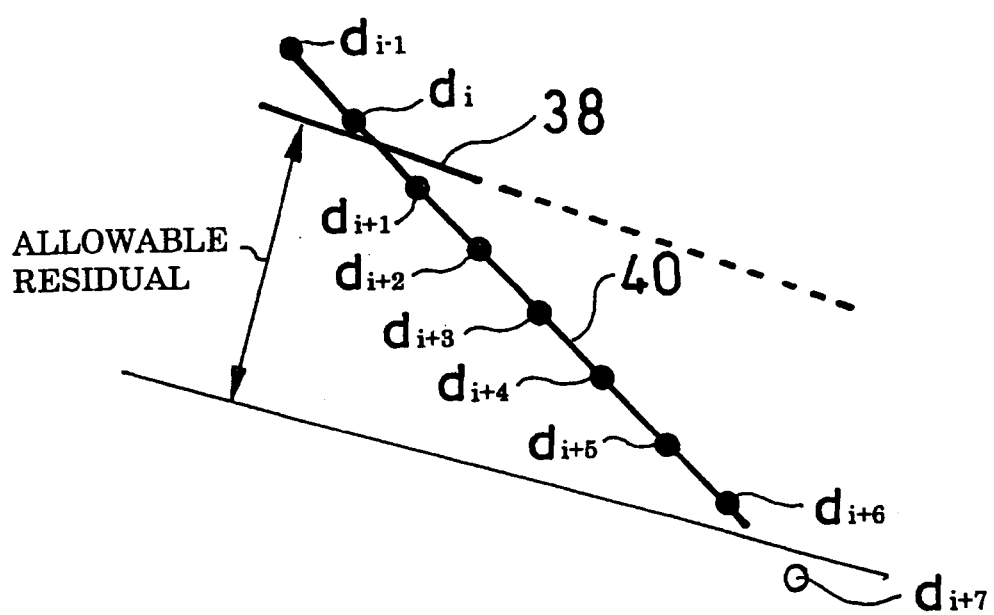
FIG. 4 is an explanatory diagram of the action of the measurement data fairing method pertaining to the first embodiment of the invention.

For example, as illustrated in FIG. 4, a linear element 38 is fitted with respect to measurement data . . . $d_{i-1}$, $d_i$ of the initial interval.

Here, a standard least squares method is commonly used for fitting calculation of the geometrical element with respect to the measurement data.

However, because it is assumed in the standard least squares method that there is no bias in the data and that error thereof is normally distributed, accurate fitting calculation can be conducted if the measurement data is common measurement data.

In the measuring machine of the invention, noise easily rides on the measurement data due to, for example, the measuring surface being scanned at a fast speed with a probe, the use of a non-contact probe, or disturbances resulting from signals from an electrical system. For this reason, measurement data that greatly deviates from the geometrical element sometimes arises. When there is measurement data that largely deviates from the geometrical element, there is the risk for the result of the fitting calculation to become abnormal, even if the number of the deviant data is minority.

Thus, in order for the measuring machine used in the invention to conduct fairing processing of measurement data, there may be errors in a minority of the measurement data considering the incompleteness of the measurement data. However, considering that the majority of the measurement data is reliable, it is particularly preferable to adopt robust estimation for the fitting calculation.

An example in which a straight line is extracted from the measurement data using biweight estimation, which is an example of robust estimation, will be described below.

First, parameters a, b, and c of a straight line $ax+by+c=0$ are derived by the standard least squares method using all of the measurement data of the initial interval. After the parameters have been derived, weight is added to each measurement datum.

Namely, a weight function w(d) that can be expressed as the following equation 1 in a directional orthogonal to the straight line is conceived with respect to the sought straight line. w(d) is derived from a sign-attached distance d from the straight line. w(d) is used for the weight of the data.

$$w(d) = \begin{cases} \left\{1-\left(\dfrac{d}{W}\right)^2\right\}^2 & |d| \leq W \\ 0 & |d| > W \end{cases} \quad \text{[Equation 1]}$$

Here, the computed weight becomes a level of how much the measurement data is to be emphasized at the time the straight line is computed. For instance, it can be thought that the larger the computed weight is, the more important is the measurement data.

After the weight has been added to each measurement datum as described above, the straight line is again sought by the weighted least squares method.

Namely, the straight line is again sought using the weighted least squares method while considering the weight that has been added to each measurement datum. By doing this, the straight line is sought where measurement data close to the initially sought straight line largely contribute to straight line calculation and far measurement data do not contribute to straight line calculation. For this reason, the probability with which a valid straight line is sought can be raised.

Here, there is the possibility that a straight line that cannot be said to yet have a sufficient degree of precision is sought when the straight line is sought only one time. For this reason, a comparison is made between the previously sought straight line and the currently sought straight line, and it is checked to see whether or not there is a large difference. Namely, when there is not a large difference, the sought straight line is determined to be a fitting element. When there is a large difference, the addition of weight to each measurement datum and re-seeking of the straight line by the weighted least squares method are repeated.

It should be noted that the seeking can be done with the same algorithm even when an element other than a straight line is sought. For instance, in the case of a circle, the weight function w(d) is considered in a direction orthogonal to a tangent of the circle.

As a result, in the standard least squares method, the result of the fitting calculation ends up being taken bad influence with respect to measurement data (outlier) that is extremely far from the geometrical element. In contrast, because robust estimation is used in the present invention, it is possible to largely reduce the influence that measurement data extremely far from the geometrical element exert on the result of the fitting calculation.

Because the weight of outlier becomes substantially zero, estimation of outlier can be easily conducted from the result of the robust fitting.

After the initial fitting step (S18) using the robust estimation, the interval extension step (S20) is conducted.

Namely, in the interval extension step (S20), the interval is extended within a range in which the residual of the measurement data with respect to the initially fitting geometrical element 38 does not exceed the allowable residual, and is used as the fitting interval of the geometrical element 38.

In the present embodiment, it is successively determined whether the geometrical element 38 is applicable with respect to subsequent measurement data $d_{i+1}, d_{i+2}, d_{i+3} \ldots$ from the measurement datum di of the endpoint of the initial interval shown in FIG. 4.

For instance, the geometrical element 38 is successively fitted with respect to the measurement data $d_{i+1}, d_{i+2}, d_{i+3} \ldots$ positioned within a range of an allowable residual in which the distance of separation from the geometrical element 38 is predetermined for the geometrical element 38.

When a data $d_{i+7}$, in which the distance of separation from the geometrical element 38 exceeds the range of the allowable residual, is detected, it has generally been determined that the measurement data $d_{i+7}$ is a different element separate from the geometrical element 38, but in actuality there are also cases where it is an outlier resulting from noise.

For this reason, conventionally, the results of fairing processing are easily disturbed by outlier and the like, leaving room for improvement of the precision with which the geometrical element is fitted to the measurement data.

Namely, as shown in FIG. 4, the measurement data $d_{i+1}$, $d_{i+2} \ldots d_{i+7}$, to which the geometrical element 38 has been fitted, are positioned within the range of the predetermined allowable residual for the geometrical element 38, but there ends up being a straight line in which the degree of precision cannot be said to be sufficient with respect to the measurement data $d_{i+1}, d_{i+2} \ldots d_{i+7}$.

Thus, in the present embodiment, a geometrical element fitting step (S22), which is a re-fitting step, is conducted with respect to measurement data of a new interval after the fitting interval determination step (S14).

Namely, in the geometrical element fitting step (S22), measurement data of the new interval is extracted from the measurement data. The geometrical element is robustly fitted to the measurement data of the new interval.

More specifically, in the geometrical element fitting step (S22), robust fitting calculation is again conducted with respect to measurement data . . . $d_{i-1}, d_i \ldots d_{i+6}$ of the new interval determined in the interval extension step (S20). A geometrical element that is most approximate to the measurement data . . . $d_{i-1}, d_i \ldots d_{i+6}$ of the new interval is re-fitted. For example, a linear element 40 illustrated in FIG. 4 is fitted.

As a result, although the initially fitting element 38 illustrated in FIG. 4 could not have been said to have a sufficient degree of precision with respect to the measurement data $d_i \ldots d_{i+6}$, the re-fitting element 40 illustrated in FIG. 4 excellently approximates the measurement data . . . $d_{i-1}, d_i \ldots d_{i+6}$.

After the geometrical element fitting step (S22), an outlier removal step (S24) is conducted.

Namely, in the outlier removal step (S24), as a result of the element 40 being robustly fitted in the geometrical element fitting step (S22), data in which the weight has become zero is estimated and detected as outlier. This outlier is removed from the measurement data of the interval, and the remaining measurement data of the interval is used as second interval measurement data.

After the outlier removal step (S24), a statistic computation step (S26) is conducted.

Namely, in the statistic computation step (S26), a statistic of the residual of the second interval measurement data is computed. For instance, a statistic (standard deviation) $\sigma$ of the residual of the second interval measurement data with respect to the element that was fitted as described above, i.e., the measurement data of the interval from which the outlier was removed, is computed.

After the statistic computation step (S26), a threshold, e.g., a threshold (limit value) $3\sigma$, is set using the sought statistic $\sigma$ as a unit.

After the setting of the threshold, an invalid data removal step (S28) is conducted.

Namely, in the invalid data removal step (S28), second interval measurement data that exceeds the threshold is regarded as invalid data and removed from the second interval measurement data on the basis of the threshold $3\sigma$ that was set as described above, and the remaining measurement data of the second interval is used as third interval measurement data. In this manner, in the invalid data removal step (S28), the validity/invalidity of the measurement data points is judged on the basis of the threshold $3\sigma$ that was set as described above.

In this manner, in the present embodiment, robust estimation is used for the fitting calculation. Moreover, when the new interval is determined after the initial fitting, fitting of the geometrical element is again conducted with respect to the measurement data of the new interval using robust estimation.

Figure 5A:
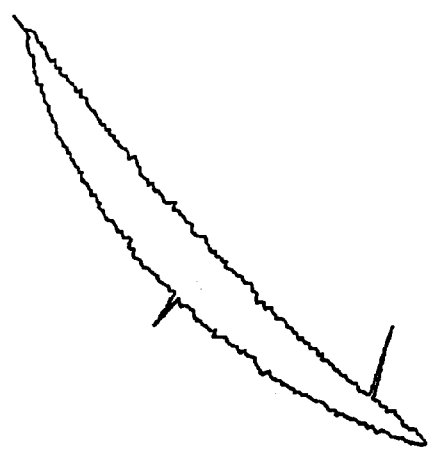
FIG. 5A illustrates original data.
Figure 5B:
FIG. 5B illustrates a result when initial fitting has been conducted with respect to the original data shown in FIG. 5A.
Figure 5C:
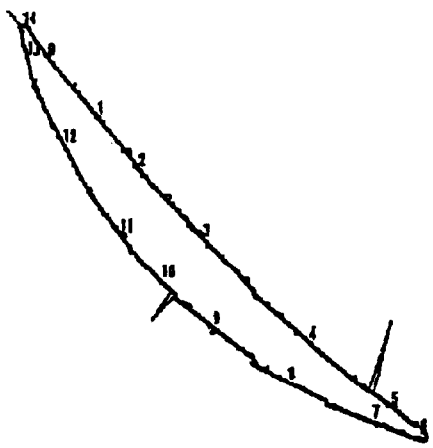
FIG. 5C illustrates a result when re-fitting has been conducted with respect to a waveform after the initial fitting shown in FIG. 5B.

FIG. 5A illustrates data in which spike noise has been added to contour data of an airfoil to which Gaussian noise has been added. FIG. 5B illustrates the result of initial robust fitting with respect to the data shown in FIG. 5A. FIG. 5C illustrates the result when robust fitting has been conducted again between the respective elements with respect to the result of the initial fitting shown in FIG. 5B.

As is clear from FIG. 5C, after the geometrical element fitting step (S22) of the present embodiment, i.e., after re-fitting, discontinuity between the respective elements is reduced in comparison with the initial fitting step (S18) shown in FIG. 5B, even in a case where the allowable residual is large.

Figure 6A:
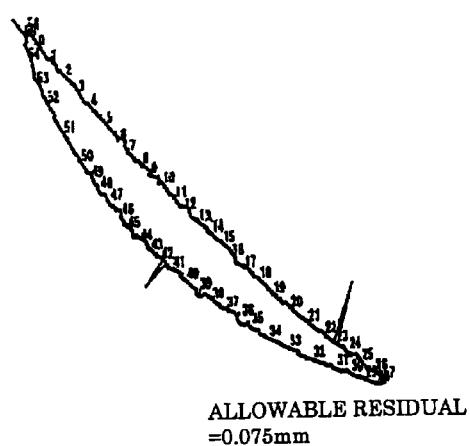
FIGS. 6A to 6C illustrate comparative results of a waveform when an allowable residual has been changed in the initial fitting shown in FIG. 5B.
Figure 6B:
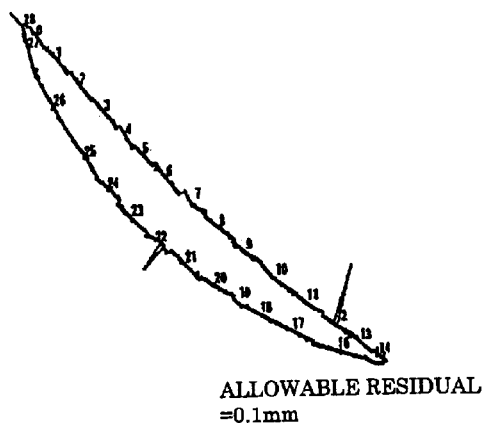
Figure 6C:
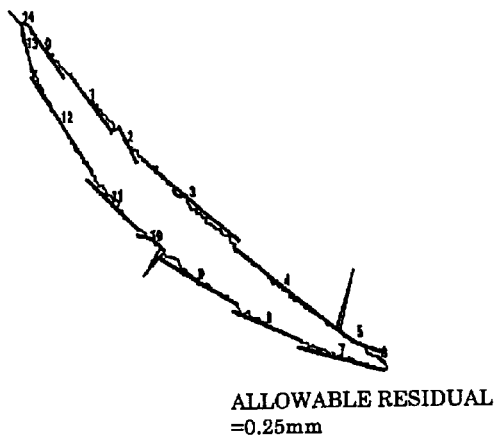

Results when the allowable residual has been changed in the initial fitting step are illustrated in FIGS. 6A to 6C. FIG. 6A illustrates a result when the allowable residual is 0.075 mm, FIG. 6B illustrates a result when the allowable residual is 0.1 mm, and FIG. 6C illustrates a result when the allowable residual is 0.25 mm.

After the initial fitting shown in FIGS. 6A to 6C, the discontinuity between the respective elements becomes conspicuous as the allowable residual becomes larger.

Figure 7A:
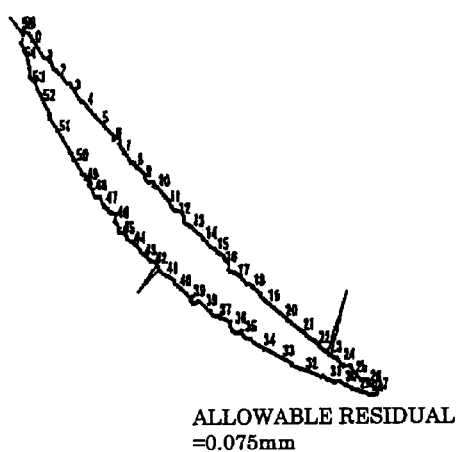
FIGS. 7A to 7C illustrate comparative results of a waveform when an allowable residual has been changed in the re-fitting shown in FIG. 5C.
Figure 7B:
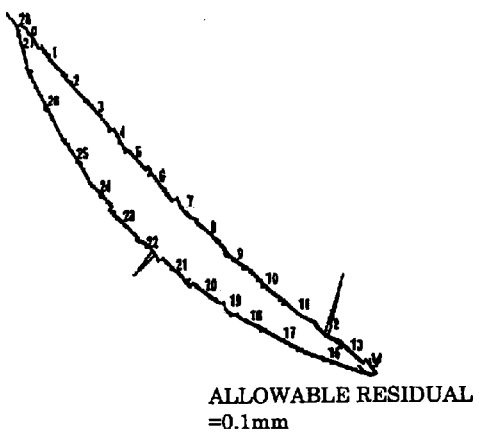
Figure 7C:
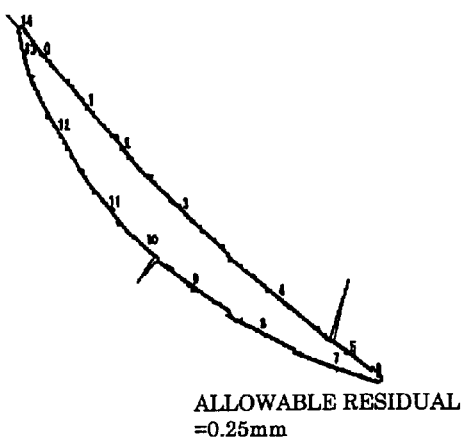

Results when the allowable residual has been changed in re-fitting are illustrated in FIGS. 7A to 7C.

FIG. 7A illustrates a result when the allowable residual is 0.075 mm, FIG. 7B illustrates a result when the allowable residual is 0.1 mm, and FIG. 7C illustrates a result when the allowable residual is 0.25 mm As is clear from FIGS. 7A to 7C, when robust fitting calculation is again conducted at each element interval with respect to the results of the initial fitting, the discontinuity between the respective elements is largely suppressed in comparison with after the initial fitting shown in FIGS. 6A to 6C, even when the allowable residual becomes larger. Moreover, the processing results being effected by spike noise is largely reduced.

As described above, according to the measurement data fairing method pertaining to the present embodiment, robust estimation is used for the fitting calculation of the geometrical element with respect to the measurement data. As a result, in the present embodiment, it is possible to largely reduce the adverse affects of outlier on the fairing result in comparison with a case in which the standard least squares method is used. Accordingly, in the present embodiment, fairing processing that is more approximate to the measurement data in comparison with conventional technology can be conducted.

oreover, in the present embodiment, robust re-fitting is conducted after determination of the new interval after the initial fitting. As a result, in the present embodiment, it is possible to even more largely suppress the discontinuity between the elements in comparison with a case where re-fitting is not conducted. Accordingly, in the present embodiment, fairing processing that is more precisely approximable to the measurement data in comparison with conventional technology can be conducted.

Also, in the present embodiment, because there is no additional processing necessary when a digital filter or the like is used, fairing processing can be conducted more easily and in a shorter amount of time in comparison with conventional methods.

Also, in the present embodiment, because the detection and removal of outlier is conducted by the outlier removal step, affects resulting from outlier can be automatically avoided.

Also, in the present embodiment, a statistical threshold is applied with respect to measurement data from which has been removed data that has been judged to be outlier by the invalid data removal step. Because measurement data points that exceed this threshold are detected as invalid data, the determination between invalid data and valid data can be conducted statistically. For this reason, in the present embodiment, by removing the invalid data, affects of measurement data separate from the distribution center can be automatically avoided with respect not only to spike noise but also to Gaussian noise.

It should be noted that the present invention is not limited to the above-described embodiment and that various modifications are possible within the range of the gist of the invention.

For example, in the above-described structure, an example was described in which the determination of whether the element to be fitted to the measurement data was a straight line or a circle was conducted on the basis of the radius of curvature of the data. However, the present invention is not limited to this structure. As long as robust estimation is used, an optional method can be applied. For example, in the determination of whether the element to be fitted to the measurement data is a straight line or a circle, a fitting data number of the straight line can be compared with a fitting data number of the circle, and the contour for which the applicable data number is large can be made into the contour of that element.

Second Embodiment

Figure 8:
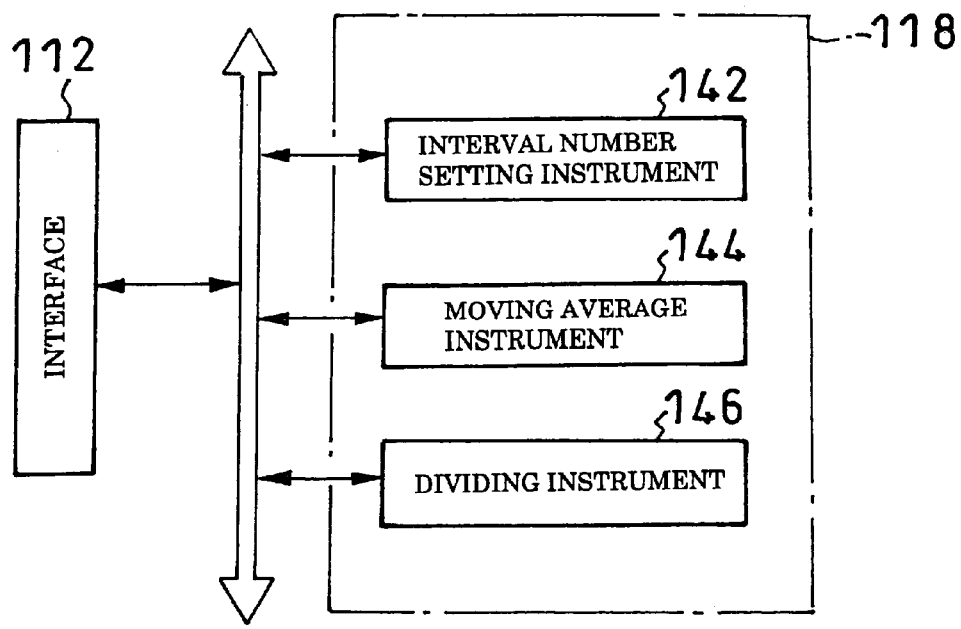
FIG. 8 is an explanatory diagram of a characteristic fitting interval determining instrument in a device for conducting a measurement data fairing method pertaining to a second embodiment of the invention.

The schematic structure of a characteristic fitting interval determining instrument in a device for conducting a fairing method pertaining to a second embodiment of the invention is illustrated in FIG. 8. 100 will be added to reference numerals of portions corresponding to portions in the first embodiment, and explanation thereof will be omitted.

The characteristic feature in the present embodiment is that, as shown in FIG. 8, a fitting interval determining instrument 118 comprises an interval number setting instrument 142, a moving average instrument 144, and a dividing instrument 146.

In the interval number setting instrument 142, the number of intervals of measurement data is set.

The moving average instrument 144 seeks the moving average curve of the measurement data.

The dividing instrument 146 seeks a length of the moving average curve sought by the moving average instrument 144, divides the measurement data into the interval number set in the interval number setting instrument 142 on the basis of the result of the sought moving average curve length being divided by the interval number set in the interval number setting instrument 142, and uses the divided measurement data as the fitting intervals.

Figure 9:
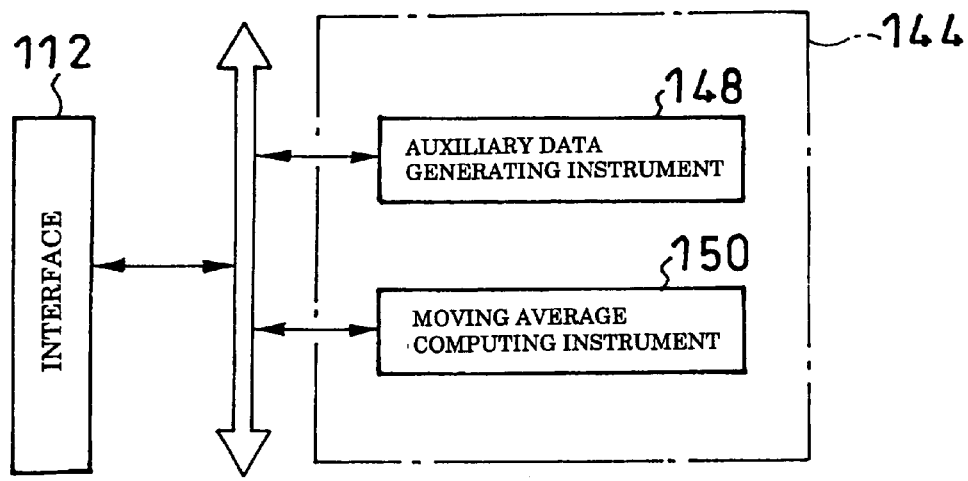
FIG. 9 is an explanatory diagram of a characteristic moving average instrument in the fitting interval determining instrument shown in FIG. 8.

The characteristic feature in the present embodiment is that, as shown in FIG. 9, the moving average instrument 144 comprises an auxiliary data generating instrument 148 and a moving average computing instrument 150.

The auxiliary data generating instrument 148 generates auxiliary data of at least one of prepositional data prepared at a portion before a starting point of the measurement data and postpositional data prepared after an ending point of the measurement data, in order to suppress transient phenomena at the time the moving average curve is sought.

The moving average computing instrument 150 seeks the moving average curve from the measurement data and the auxiliary data.

The measurement data fairing device pertaining to the second embodiment of the invention is schematically structured as described above, and the action thereof will be described below.

First, the characteristic fitting interval determination step in the present embodiment is conducted after the data importation step and the parameter setting step.

Figure 10:
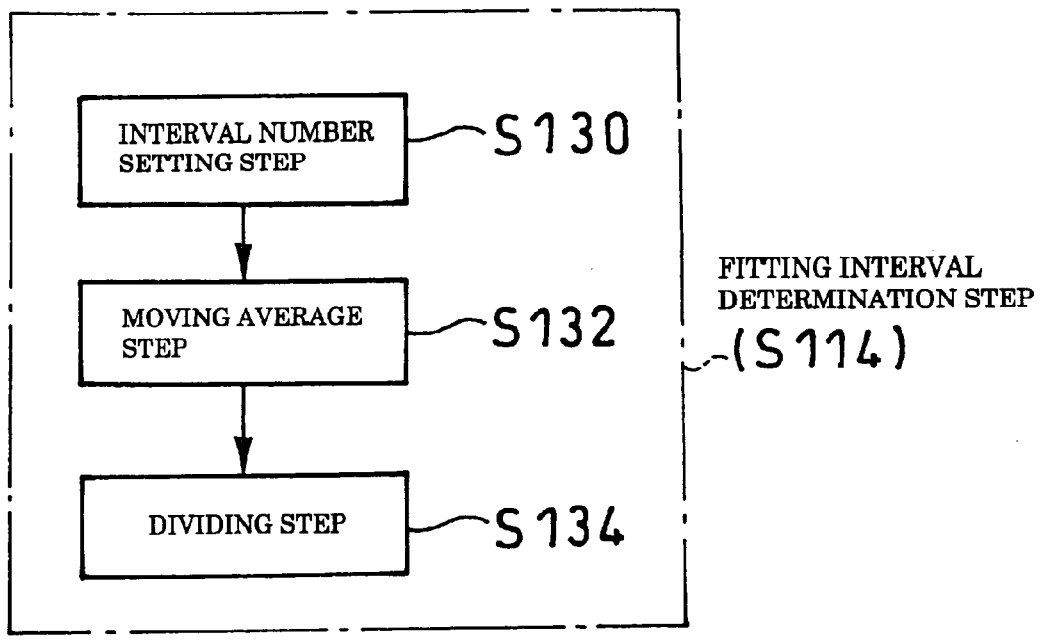
FIG. 10 is a flow chart illustrating a processing order in a characteristic fitting interval determination step in the second embodiment of the invention.

Namely, as shown in FIG. 10, a fitting interval determination step (S114) comprises an interval number setting step (S130), a moving average step (S132), and a dividing step (S134).

In the interval number setting step (S130), an operator inputs the number of intervals of the measurement data using the manual input instrument. This number is stored in the interval number setting instrument.

After the interval number setting step (S130), the moving average step (132) is conducted.

Namely, in the moving average step (S132), the moving average curve of the measurement data is sought.

After the moving average step (S132), the dividing step (S134) is conducted.

Namely, in the dividing step (S134), the length of the moving average curve is sought, the measurement data is divided into the interval number set in the interval number setting step (S130) on the basis of the result when the moving average curve length is divided by the interval number at the interval number setting step (S130), and the divided measurement data is used as the fitting intervals.

Figure 11:
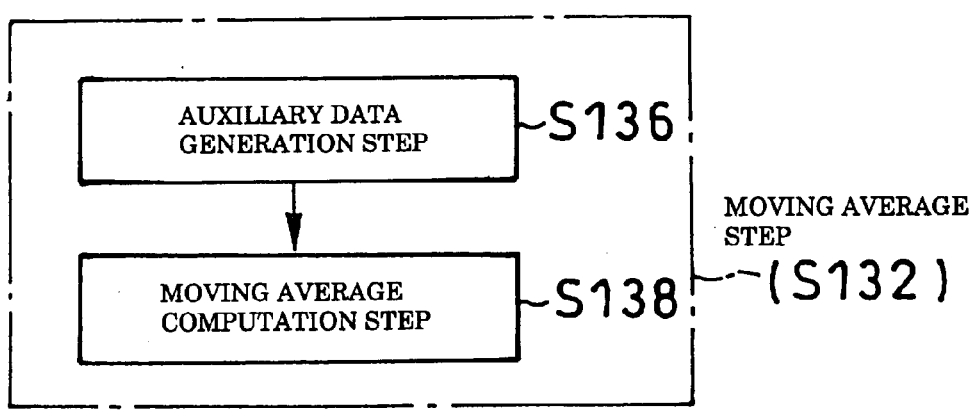
FIG. 11 is a flow chart illustrating a processing order in a moving average step shown in FIG. 10.

As shown in FIG. 11, the moving average step (S132) comprises an auxiliary data generation step (S136) and a moving average computation step (computation step) (S138).

In the auxiliary data generation step (S136), auxiliary data of at least one of the prepositional data prepared at the portion before the starting point of the measurement data and the postpositional data prepared after the ending point of the measurement data is generated.

For example, the auxiliary data is generated by mirroring conversion using the ending point of the measurement data as a center. In particular, in a case where the distance between the ending point and the starting point of the measurement data is within a predetermined distance, the prepositional data is generated using part of the measurement data positioned before the ending point of the measurement data. The postpositional data is generated using part of the measurement data positioned after the starting point of the measurement data.

After the auxiliary data generation step (S136), the moving average computation step (S138) is conducted.

Namely, in the moving average computation step (S138), the moving average curve is sought from the measurement data and the auxiliary data.

After the moving average step (S132), the geometrical element fitting step, the outlier removal step, the statistic computation step, and the invalid data removal step are conducted.

In this manner, in the present embodiment, the length of the moving average curve is sought by the dividing step (S134). Additionally, the sought length of the moving average curve is divided by the interval number set in the interval number setting step (S130). Based on the result of that division, the measurement data is divided into the interval number set in the interval number setting step (S130), whereby it is made into fitting intervals having a predetermined length on a moving average curve.

After the dividing step (S134), the geometrical element fitting step is conducted.

Figure 12:
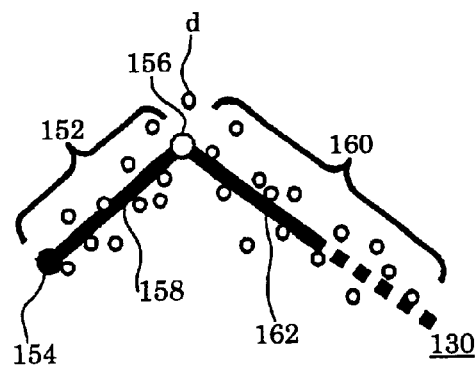
FIG. 12 is an explanatory diagram of a fitting step in the embodiment of the invention.

For example, as shown in FIG. 12, a kinked line (geometrical element) 130 is fitted with respect to measurement data d of the fitting intervals. In other words, best fit of the kinked line 130 comprising a node 156 is conducted using robust estimation with respect to a starting point 154, and a left-side segment 158 and a right-side half-line 162 are sought.

As a result, in the present embodiment, similar to the first embodiment, because discontinuity at each fitting interval does not arise while the processing burden is reduced, excellent waveform fairing can be conducted. Moreover, in the present embodiment, the detection and removal of outlier can be conducted at the same time as the waveform fairing by the kinked line.

The characteristic steps in the present embodiment will be described in greater detail below.

<Fitting Interval Determination Step>

Figure 13A:
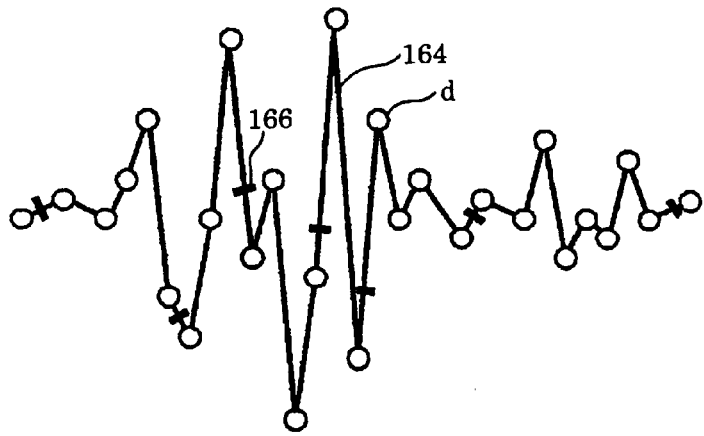
FIGS. 13A and 13B illustrate comparative examples of divisional positions of measurement data when a dividing step of the embodiment of the invention is used and when a common dividing step is used.

When the measurement data d are divided into intervals, the data are ordinarily divided at dividing positions 166 based on the distance of a common curve 164 joining the measurement data d, as shown in FIG. 13A. However, in this case, there are affects resulting from noise.

Figure 13B:
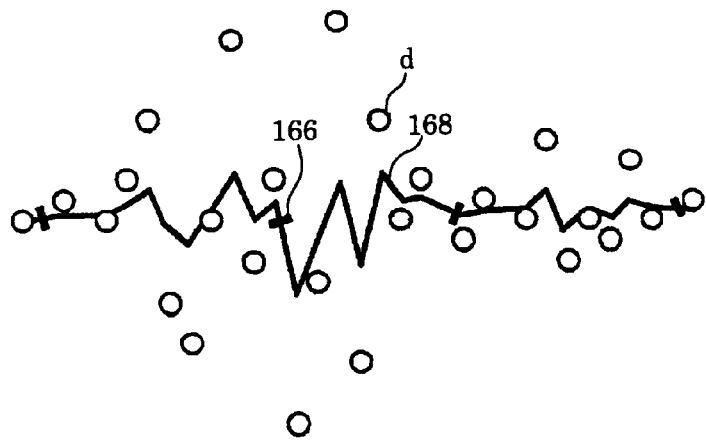

Thus, in the present embodiment, when the dividing positions of the measurement data d is determined, a distance between the data points processed by a two-dimensional moving average filter expressed by the following equation 2 is used. In other words, the dividing positions 166 of the measurement data d are determined on a moving average curve 168 joining filtering points, as shown in FIG. 13B.

$$(x_i, y_i) = \left( \frac{1}{W} \sum_{k=-W/2}^{k=W/2} x_{i+k}, \frac{1}{W} \sum_{k=-W/2}^{k=W/2} y_{i+k} \right)$$ [Equation 2]

W is a size of a window corresponding to a cutoff wavelength.

As a result, in the present embodiment, by using the moving average filter to determine the dividing positions of the measurement data d, the influence of noise at the time the measurement data are divided can be largely suppressed. Moreover, in the present embodiment, because calculation of the moving average filter is easy, can lighten the burden with respect to the determination processing of the division directions of the measurement data.

<Auxiliary Data Generation Step>

In the moving average filter processing, when both ends of the measurement data are open, transient phenomena approximate to the starting point and the ending point are generated.

Thus, in the present embodiment, in order to suppress transient phenomena at the time the moving average curve is sought, and particularly transient phenomena approximate to the starting point and the ending point, auxiliary data of at least one of the prepositional data prepared at the portion before the starting point of the measurement data and the postpositional data prepared after the ending point of the measurement data is prepared.

Additionally, in the present embodiment, the moving average curve is sought in the moving average computation step from the measurement data and the generated auxiliary data.

In the present embodiment, when the distance between the ending point and the starting point of the measurement data is within the predetermined distance (when both ends of the measurement data are closed), the prepositional data are generated using part of the measurement data positioned before the ending point of the measurement data. Additionally, the postpositional data are generated using part of the measurement data positioned after the starting point of the measurement data.

Figure 14A:
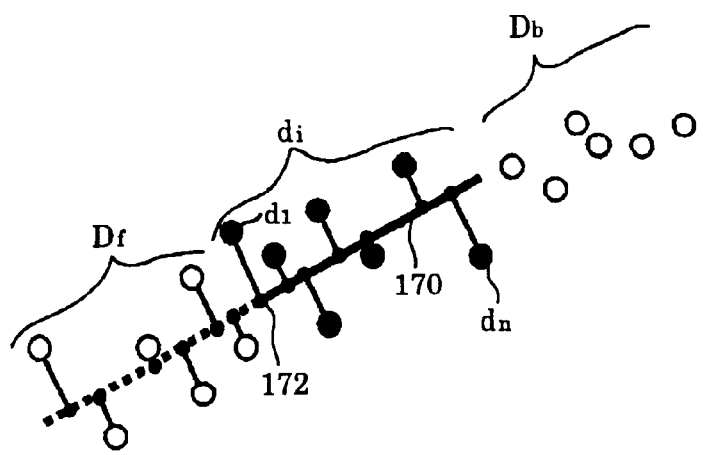
FIGS. 14A and 14B are explanatory diagrams of an auxiliary data generation step of the embodiment of the invention.

Namely, in the present embodiment, as shown in FIG. 14A, fitting calculation of a straight line is conducted and an average line 170 is determined using measurement data $d_i$ of intervals corresponding to the cutoff wavelength of the moving average filter from a starting point $d_1$ (ending point $d_n$) of the measurement data d.

Next, the average line 170 is extended to a prepositional (postpositional) region, and prepositional data $D_f$ (postpositional data $D_b$) are generated by mirroring conversion in which a point at which the starting point $d_1$ of the measurement data (ending point $d_n$ of the data) is projected on the average line 170 is used as a mirror center 172.

Figure 14B:
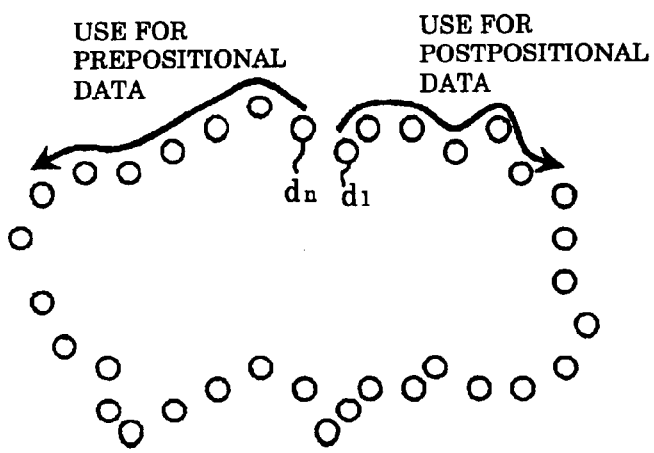

When both ends of the measurement data d are closed, as shown in FIG. 14B, the measurement data from the ending point $d_n$ (starting point $d_1$) of the measurement data is used as it is for the prepositional (postpositional) data at the starting point $d_1$ side (ending point $d_n$ side) of the measurement data.

<Fitting Step and Outlier Removal Step>

Figure 15:
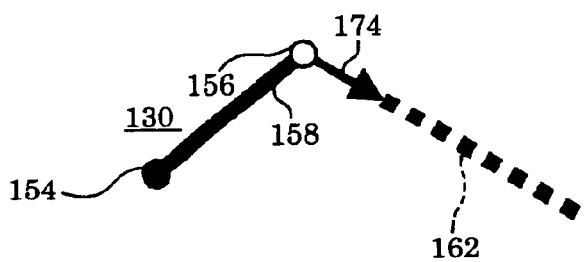
FIG. 15 is an explanatory view of a kinked line element of the embodiment of the invention.

In the present embodiment, after the measurement data has been divided through the moving average filter as described above, the moving average curve is used as the fitting geometrical element with respect to the measurement data of each fitting interval. For instance, the kinked line element 130 shown in FIG. 15 is used as the fitting geometrical element.

In the kinked line element 130, the starting point 154 ($x_f$, $y_f$) of the left-side segment 158 is made to coincide with a node of the previous kinked line element that has already been determined, and is fixed. Unknown parameters are used as coordinate values of the node 156 ($x_n$, $y_n$) between the left-side segment 158 and a right-side half-line 162 and a directional vector 174 ($t_x$, $t_y$) of the right-side half-line 162 from the node 156.

Namely, in the present embodiment, because the starting point of the fitting kinked line element (geometrical element) is made to coincide with the immediately previous node that has already been determined, continuity of the kinked line in each fitting interval can be reliably maintained.

The data that is the target of fitting in this case become all of the data from the data corresponding to the node that has just been determined to the present interval, and the data of the interval for which fitting processing is about to be conducted.

In other words, in a case where a node is present at the current interval, the data from the immediately previous node position to the node position of the current interval is approximated to the left-side segment 158. The remaining data of the current interval is approximated to the right-side half-line 162.

Robust fitting according to the kinked line element 130 is conducted with respect to the measurement data of each fitting interval.

In the present embodiment, similar to the first embodiment, the parameters of the kinked line element that is the geometrical element are determined by the robust least squares method. A performance function $f_i$ of each measurement datum is defined in the following manner by the positional relationship that becomes the shortest distance to the kinked line element.

Figure 16A:
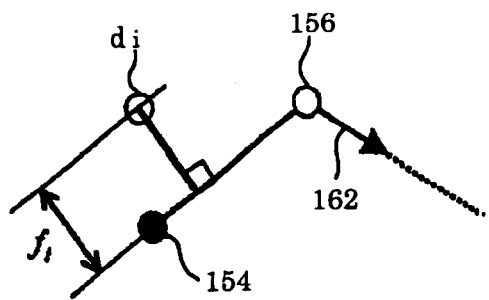
FIGS. 16A to 16D are explanatory diagrams illustrating positional relationships between the kinked line element and measurement data of the embodiment of the invention.

Namely, when the measurement data and the kinked line element are in the positional relationship shown in FIG. 16A, the performance function $f_i$ expressed by the following equation 3 is used.

$$f_i = \left| \frac{-(x_i - x_f) \cdot (y_n - y_f) + (y_i - y_f) \cdot (x_n - x_f)}{\sqrt{(x_n - x_f)^2 + (y_n - y_f)^2}} \right| \quad \text{[Equation 3]}$$

Figure 16B:
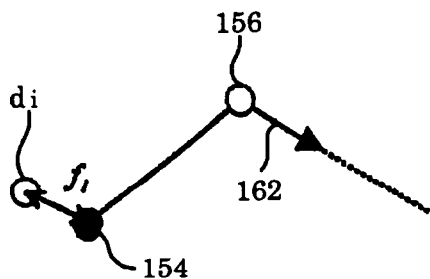

In the positional relationship shown in FIG. 16B, the performance function $f_i$ expressed by the following equation 4 is used.

$$f_i = \sqrt{(x_i - x_f)^2 + (y_i - y_f)^2} \quad \text{[Equation 4]}$$

Figure 16C:
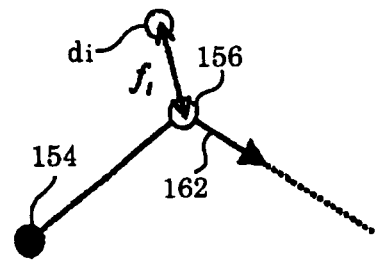

In the positional relationship shown in FIG. 16C, the performance function $f_i$ expressed by the following equation 5 is used.

$$f_i = \sqrt{(x_i - x_n)^2 + (y_i - y_n)^2} \quad \text{[Equation 5]}$$

Figure 16D:
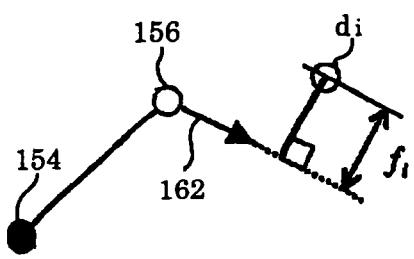

In the positional relationship shown in FIG. 16D, the performance function $f_i$ expressed by the following equation 6 is used.

$$f_i = |-(x_i - x_f) \cdot t_y + (y_i - y_f) \cdot t_x| \quad \text{[Equation 6]}$$

When the weight in each measurement datum is $w_i$, a parameter that minimizes the following equation 7 is determined.

$$\Phi = \sum_{i=1}^{N} w_i \cdot f_i^2 \quad \text{[Equation 7]}$$

The stationary condition of $\Phi$ can be provided by the following equation 8.

$$\frac{1}{2} \cdot \nabla \Phi \equiv J^T \cdot f = 0 \quad \text{[Equation 8]}$$

Because the coordinate values $(x_n, y_n)$ of the node 156 and the directional vector $(t_x, t_y)$ of the right-side half-line 162 from the node 156 are determined by solving this equation, an optimum kinked line element is determined with respect to the measurement data.

However, in equation 8, J is Jacobian and f is a performance function vector that are represented by the following equation 9.

$$J = \begin{bmatrix} \partial f_1/\partial x_n & \partial f_1/\partial y_n & \partial f_1/\partial t_x & \partial f_1/\partial t_y \\ \vdots & \vdots & \vdots & \vdots \\ \partial f_N/\partial x_n & \partial f_N/\partial y_n & \partial f_N/\partial t_x & \partial f_N/\partial t_y \end{bmatrix} \quad \text{[Equation 9]}$$

$$f = \begin{bmatrix} f_1 \\ \vdots \\ f_N \end{bmatrix}$$

In the present embodiment, the stationary condition is nonlinear, and in determining the parameters, detection of outlier can be conducted at the same time as robust fitting of the kinked line element by using a robust nonlinear least squares method and solving.

Namely, outlier is detected from the result of the robust fitting by the outlier removal step, and the outlier is removed from the measurement data.

<Invalid Data Removal Step>

Next, in the present embodiment, the statistic computation step is conducted.

Namely, in the statistic computation step, the statistic (standard deviation) σ of the residual of the second interval measurement data with respect to the kinked line element that was fitted as described above, i.e., the measurement data of the interval from which the outlier was removed, is computed.

Additionally, the threshold, e.g., a threshold 3σ, is set using the sought statistic σ as a unit.

After the setting of the threshold, the invalid data removal step is conducted.

Namely, in the invalid data removal step, the validity/invalidity of the measurement data points is determined at the threshold 3σ that was set as described above.

Figure 17:
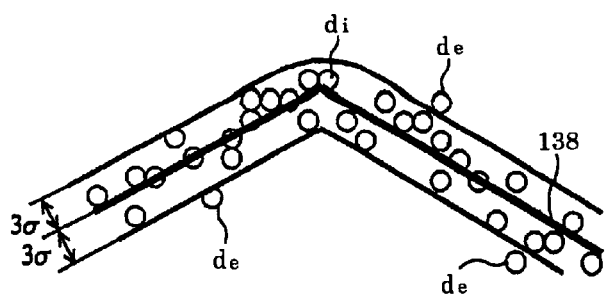
FIG. 17 is an explanatory diagram of an invalid data removal step of the embodiment of the invention.

For example, as illustrated in FIG. 17, measurement data $d_e$ that become performance amounts exceeding the threshold 3σ with respect to a kinked line element 138 are detected as invalid data and removed.

Also, in the present embodiment, the geometrical element fitting step, the outlier removal step, the statistic computation step, and the invalid data removal step are successively conducted using the node of the interval determined in the fitting interval determination step as the starting point of the next fitting interval. Thus, the present embodiment is applied with respect to all of the measurement data.

Figure 18:
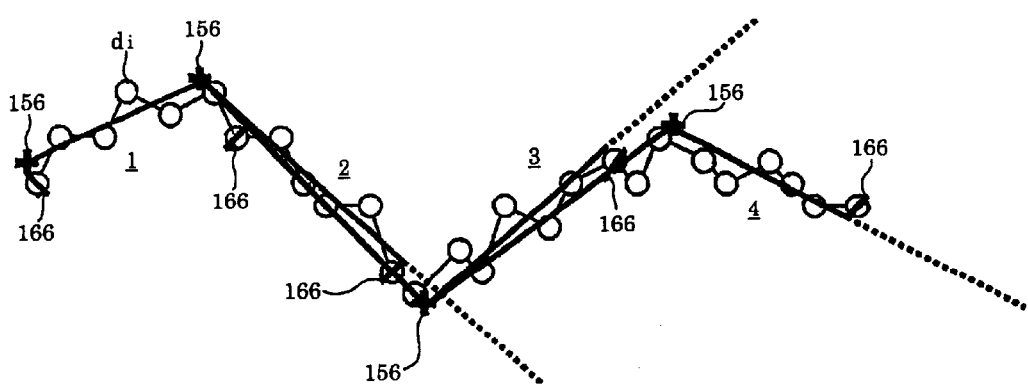
FIG. 18 illustrates an example when a kinked line element is fitted to all data in the embodiment of the invention.

Namely, as illustrated in FIG. 18, these steps are repeated while staggering fitting intervals 1, 2, 3, and 4 so that the node 156 of the previous kinked line element becomes the starting point of the next kinked line element. Thus, a kinked line having plural nodes 156 is fitted with respect to all of the measurement data. Because the starting points of the geometrical element fitted in this manner are present on the fitting geometrical element in adjacent intervals, continuity of the respective geometrical elements is maintained. Moreover, in the present embodiment, flags for whether data are outlier or not are set at the same time as the fitting of the kinked line with respect to each measurement datum.

In this manner, in the present embodiment, the results through the moving average filter are used to determine the divisional direction of the intervals for which fitting calculated is to be conducted. Thus, the influence of noise in the interval determination can be suppressed. Moreover, in the present embodiment, because calculation of the divisional direction of the intervals becomes easy by using the moving average filter, the burden with respect to calculation processing can be largely reduced.

Additionally, in the present embodiment, similar to the first embodiment, by using robust fitting calculation as the fitting calculation, a waveform fairing result that is substantially unaffected by outlier can be obtained. Moreover, in the present embodiment, by using the kinked line as the fitting element, continuity between the fitting elements can be further maintained.

Figure 19A:
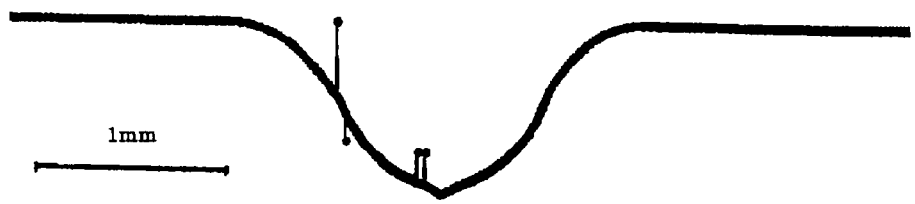
FIGS. 19A and 19B illustrate results of measurement data fairing processing according to the embodiment of the invention.
Figure 19B:
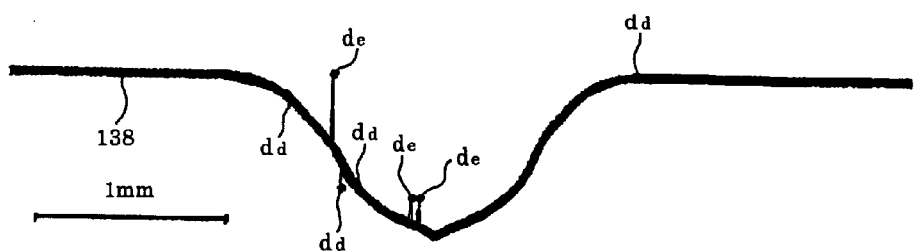

For example, a result when the present embodiment has been implemented is shown in FIG. 19B, with respect to a result in which spike noise has been added to measurement data illustrated in FIG. 19A. In these drawings, conditions are such that a standard length of the element (length of one interval obtained by interval division) is 0.5 mm, the limit value is $3\sigma$, and the moving average cutoff wavelength is $4 \times 0.5$ mm.

As is clear from FIGS. 19A and 19B, in the present embodiment, detection and removal of the outlier $d_e$ can be conducted at the same time as waveform fairing by the kinked line 138 with respect to the measurement data illustrated in FIG. 19A. Also, detection and removal of the invalid data $d_d$ can be conducted by the subsequent invalid data removal step.

Figure 20:
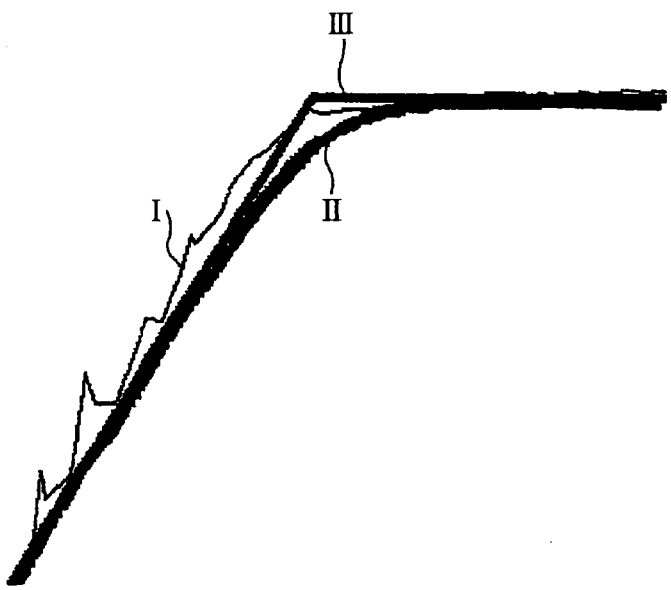
FIG. 20 illustrates comparative results of edge contours of waveforms when the measurement data fairing method according to the embodiment of the invention is used and when a common measurement data fairing method according to a Gaussian Filter is used.

FIG. 20 illustrates comparative results of a waveform after fairing processing according to the present embodiment and a waveform after fairing processing according to a common Gaussian Filter. In FIG. 20, conditions are such that the cutoff wavelength is 0.5 mm and the standard length of the element is 0.5 mm.

In (III), which represents the waveform of the present embodiment, the contour of edge portions of original data (I) becoming dull is largely reduced, in comparison to (II), which represents the waveform of the common Gaussian Filter.

Figure 21A:
FIGS. 21A to 21C illustrate comparative results of gains of waveforms when the measurement data fairing method according to the embodiment of the invention is used and when the common measurement data fairing method according to the Gaussian Filter is used.
Figure 21B:
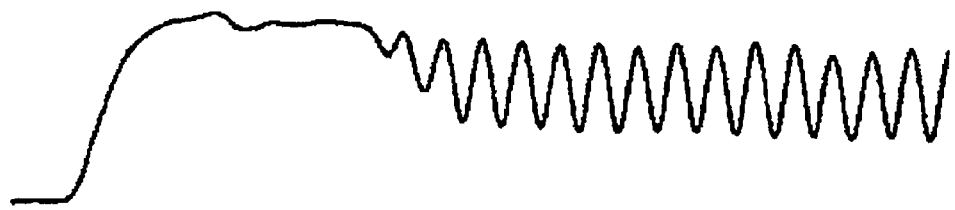
Figure 21C:
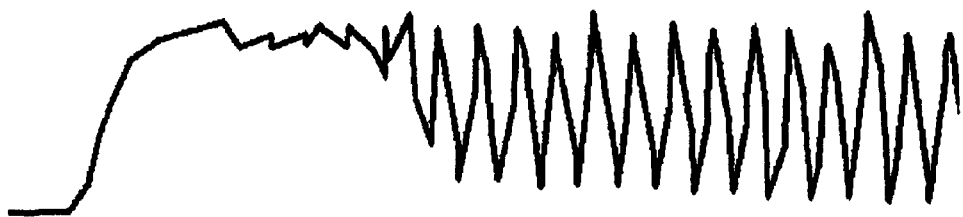

FIGS. 21A to 21C illustrate comparative results of a waveform after fairing processing according to the present embodiment and a waveform after fairing processing according to a common Gaussian Filter. FIG. 21A illustrates threaded groove measurement data, FIG. 21B illustrates a result after fairing processing by the common Gaussian Filter with respect to the threaded groove measurement data, and FIG. 21C illustrates a result after fairing processing in the present embodiment with respect to the threaded groove measurement data. In FIG. 21B, conditions were such that the cutoff wavelength was 1.0 mm. In FIG. 21C, conditions were such that the standard length of the element was 0.5 mm, the limit value was $3\sigma$, and the moving average cutoff wavelength was $4 \times 1.0$ mm.

In FIG. 21C, which illustrates the waveform after fairing processing according to the present embodiment, damping of the gain is largely reduced in comparison to FIG. 21B, which illustrates the waveform after fairing processing according to the common Gaussian Filter.

As described above, in the measurement data fairing method pertaining to the present embodiment, robust estimation is employed for fitting calculation for conducting successive fitting of the kinked line element. As a result, in the present embodiment, similar to the first embodiment, discontinuity between the elements can be suppressed in comparison to conventional methods.

Moreover, in the present embodiment, the moving average filter, which is excellent in that calculation is easy, is used in the determination of the divisional direction of the fitting intervals. Thus, in the present embodiment, because the processing burden of calculation can be largely reduced, the fitting intervals can be more easily determined and in a shorter amount of time in comparison with the first embodiment. Also, in the present embodiment, the influence of noise in the interval determination can be suppressed.

Also, in the present embodiment, because the detection and removal of outlier can be conducted at the same time as the fitting of the kinked line, fairing processing and the detection and removal of the outlier can be conducted easily and in a short amount of time.

Also, in the present embodiment, similar to the first embodiment, because there is no additional processing that becomes necessary when using a digital filter or the like, fairing can be conducted more easily and in a short amount of time in comparison to conventional methods.

Also, in the present embodiment, similar to the first embodiment, the statistical limit value is provided with respect to measurement data from which data that has been judged to be outlier by robust estimation has been removed. By detecting measurement data points exceeding this threshold as invalid data, the judgment of invalid data and valid data can be statistically conducted. For this reason, in the present embodiment, similar to the first embodiment, the influence of measurement data separate from the center of distribution can be automatically avoided by removing the invalid data with respect not only to spike noise but also to Gaussian noise.

It should be noted that, although a kinked line, which used a straight line as a basis as a fitting form, was used in the present embodiment, it is also easy to substitute the straight line portion of the kinked line with another contour such as a circular arc. In regard to whether the kind of element is a straight line or a circular arc, this can be determined according to the curvature and the like of the measurement data.

Also, because the fitting of the kinked line element is local, the results with respect to local regions obtained at the measurement data fairing device of the present embodiment can be fed back to the measuring machine, whereby use in real time becomes possible.

As described above, according to the measurement data fairing method pertaining to the invention, there is comprised the fitting interval determination step, in which an interval in which a geometrical element is fitted to measurement data is determined, and the geometrical element fitting step, in which interval measurement data in the interval is extracted and the geometrical element is robustly fitted.

As a result, because the invention employs robust fitting calculation, fairing processing can be excellently conducted while reducing the processing burden of the fairing processing of the measurement data. Moreover, in the invention, the removal of outlier can be conducted by the outlier removal step. Also, in the invention, the removal of invalid data can be conducted by the invalid data removal step.

Also, in the invention, the geometrical element fitting step comprises the initial fitting step, in which the geometrical element is robustly fitted to measurement data of an initial interval, and the interval extension step, in which the interval is extended in a range in which the residual of the measurement data with respect to the initially fitting geometrical element does not exceed an allowable residual.

Thus, fairing processing can be excellently conducted while reducing the processing burden of fairing processing of the measurement data.

Also, in the invention, the fitting interval determination step comprises the moving average step, in which the moving average curve of the measurement data is sought, and the dividing step, in which the measurement data is divided into plural intervals and made into fitting intervals on the basis of the length of the moving average curve. Thus, fairing processing of the measurement data can be excellently conducted while further reducing the processing burden. Moreover, removal of outlier can be conducted at the same time as the fairing processing of the measurement data.

Also, in the invention, the moving average step comprises the moving average computation step, in which the moving average curve is sought from the measurement data and the auxiliary data generated in the auxiliary data generation step. Thus, because transient phenomena when the moving average curve is sought can be largely suppressed, the fairing processing can be more excellently conducted.

Moreover, in the invention, the starting point of the fitting geometrical element is present on the fitting geometrical element in an adjacent interval. Thus, in the invention, continuity between the respective fitting elements can be obtained.

What is claimed is:

1. A measurement data fairing method that fits a geometrical element to measurement data and conducts fairing processing of the measurement data on the basis of a statistic of a residual of the measurement data with respect to the geometrical element, said method comprising:

a fitting interval determination step for determining an interval in which the geometrical element is to be fitted to the measurement data;

a geometrical element fitting step for extracting interval measurement data in the fitting interval from the measurement data and robustly fitting the geometrical element to the extracted interval measurement data;

an outlier removal step for removing, on the basis of the result of the robust fitting conducted by the geometrical element fitting step, outlier from the interval measurement data and using the remaining interval measurement data as the interval measurement data;

a statistic computation step for computing, with respect to the geometrical element fitted in the geometrical element fitting step, a statistic of a residual of the interval measurement data after the outlier removal step; and an invalid data removal step for removing, as invalid data, measurement data that exceeds a predetermined limit value of the statistic of the residual of the measurement data with respect to the geometrical element from the interval measurement data after the outlier removal step on the basis of the statistic of the residual computed in the statistic computation step, and using the remaining interval measurement data as the interval measurement data.

2. The measurement data fairing method according to claim 1, wherein the geometrical element fitting step, the outlier removal step, the statistic computation step, and the invalid data removal step are successively conducted for a next fitting interval using, as a starting point of the next fitting interval, next data adjacent to an ending point of the interval determined in the fitting interval determination step.

3. The measurement data fairing method according to claim 1, wherein the fitting interval determination step comprises an initial interval setting step for setting an initial interval of a predetermined data number for the measurement data, an initial fitting step for extracting, from the measurement data, initial interval measurement data in the initial interval set in the initial interval setting step, and robustly fitting the geometrical element to the extracted initial interval measurement data, and an interval extension step for extending the initial interval in a range in which the residual of the measurement data with respect to the geometrical element fitted in the initial fitting step does not exceed a predetermined allowable residual of the measurement data with respect to the geometrical element, and using the initial interval as the fitting interval of the geometrical element.

4. The measurement data fairing method according to claim 1, wherein the fitting interval determination step comprises an interval number setting step for setting a number of intervals of the measurement data, a moving average step for seeking a moving average curve of the measurement data, and a dividing step for dividing, on the basis of a result when a length of the moving average curve sought in the moving average step has been divided at the interval number set in the interval number setting step, the measurement data into the interval number set in the interval number setting step, and respectively using the divided measurement data as the fitting interval.

5. The measurement data fairing method according to claim 4, wherein the moving average step comprises an auxiliary data generation step for generating auxiliary data of at least one of prepositional data prepared at a portion before a starting point of the measurement data and postpositional data prepared after an ending point of the measurement data, and a computation step for seeking the moving average curve from the measurement data and the auxiliary data.

6. The measurement data fairing method according to claim 5, wherein the auxiliary data are generated by mirroring conversion using the starting point or the ending point of the measurement data as a center.

7. The measurement data fairing method according to claim 5, wherein, when a distance between the starting point and the ending point of the measurement data is within a predetermined distance, the prepositional data are generated using part of the measurement data positioned before the ending point of the measurement data and the postpositional data are generated using part of the measurement data positioned after the starting point of the measurement data.

8. The measurement data fairing method according to claim 1, wherein a type of the geometrical element comprises one or two or more types selected from the group consisting of a straight line, a kinked line, and a circular arc.

9. The measurement data fairing method according to claim 2, wherein a type of the geometrical element comprises plural geometrical elements.

10. The measurement data fairing method according to claim 2, wherein a starting point of the fitting geometrical element is present on the geometrical element in an adjacent previous interval.

* * * * *